(12) United States Patent
Miller

(10) Patent No.: US 6,727,997 B1
(45) Date of Patent: Apr. 27, 2004

(54) SYSTEM AND METHOD FOR ADDITIONAL FONT AVAILABILITY

(75) Inventor: Howard A. Miller, Saratoga, CA (US)

(73) Assignee: Apple Computer, Inc., Cupertino, CA (US)

(*) Notice: Subject to any disclaimer, the term of this patent is extended or adjusted under 35 U.S.C. 154(b) by 1826 days.

(21) Appl. No.: 08/674,937

(22) Filed: Jul. 3, 1996

Related U.S. Application Data

(63) Continuation of application No. 08/446,890, filed on May 17, 1995, now abandoned.

(51) Int. Cl.[7] .................................................. G06F 3/14
(52) U.S. Cl. ................................... 358/1.11; 358/1.16
(58) Field of Search ............................... 395/101, 110, 395/111, 112, 114, 115, 150; 358/1.11, 1.16, 1.15; 345/3.3, 3.31

(56) References Cited

U.S. PATENT DOCUMENTS

| | | | | |
|---|---|---|---|---|
| 5,175,811 A | * | 12/1992 | Sone et al. ................. 395/150 |
| 5,288,155 A | * | 2/1994 | Suzuki ....................... 395/110 |
| 5,305,428 A | * | 4/1994 | Osawa ....................... 395/110 |
| 5,347,266 A | * | 9/1994 | Bauman et al. ............. 395/150 |
| 5,367,618 A | * | 11/1994 | Ishida ........................ 395/145 |
| 5,409,318 A | * | 4/1995 | Imamiya ..................... 400/76 |
| 5,410,640 A | * | 4/1995 | Morikawa et al. .......... 395/117 |
| 5,428,462 A | * | 6/1995 | Kim et al. .................. 358/462 |

* cited by examiner

Primary Examiner—Steven Sax
(74) Attorney, Agent, or Firm—Mark A Aaker

(57) ABSTRACT

Unused space in a storage medium such as a read only memory is used to store additional fonts, thereby increasing the total number of fonts stored in an apparatus. A portion of the fonts stored in the apparatus are made available to a user using traditional methods. If a key is present or has been added to the apparatus, the additional fonts are made available to the user. Examples of a key include software code, a hardware jumper or a card with a hardware identification or jumper.

13 Claims, 4 Drawing Sheets

SYSTEM AND METHOD FOR ADDITIONAL FONT AVAILABILITY

This is a continuation of application Ser. No. 08/446,890, filed May 17, 1995, now abandoned.

BACKGROUND OF THE INVENTION

1. Field of the Invention

The present invention relates in general to output devices such as printers, and more particularly to font availability in output devices. Still more particularly, the present invention relates to a method and apparatus for additional font availability.

2. Description of the Prior Art

In output devices, such as printers, fonts are typically stored in the read only memory (ROM) within the printer. Some printers, particularly low cost printers, contain only the number of fonts that will be available to a user when the printer is in operation. In other words, only the number of fonts that can be used are stored in the printer. This means a printer may contain a subset of the total number of commercially available fonts. This is generally done in order to keep the cost low.

If a user wants to have access to a greater number of fonts, he or she has two options. First, the user can purchase a printer having a larger amount of ROM with more fonts stored in the ROM. In printers, information about the fonts is stored in RAM. Consequently, a larger amount of RAM also needs to be available in order to use more fonts. Increasing both the amount of RAM and ROM in the printer, however, makes the printer more expensive due to the high cost of memory.

The second option is to purchase a printer with a reduced number of fonts, and then purchase additional RAM plus additional fonts. Increasing the amount of RAM allows the printer to use the additional fonts. Next, the user needs to add the additional fonts to the printer. Increasing the number of fonts the printer can use can be done in several ways.

One way is to purchase a font cartridge. A font cartridge has additional fonts stored in a ROM within the cartridge. This font cartridge is inserted into a cartridge port in the printer. Once the font cartridge and additional RAM are installed, the user has access to the additional fonts.

A second way to increase the number of fonts is to purchase software containing fonts that can be downloaded into RAM The additional RAM needs to be installed before the user downloads the fonts, so that the RAM is large enough to hold the additional fonts.

From a user's perspective, both options are undesirable because they require the user to pay more to own and operate a printer. The first option of purchasing a printer with an increased amount of RAM and ROM is expensive due to the cost of memory. The second option is more costly for the user because he or she must purchase the additional RAM plus the additional fonts.

Therefore, increasing the number of available fonts in an output device such as a printer in an efficient and cost effective manner is desirable.

SUMMARY OF THE INVENTION

Unused space in a storage medium such as a read only memory is used to store additional fonts, thereby increasing the total number of fonts stored in an apparatus. A portion of the fonts stored in the apparatus are made available to a user using traditional methods. If a key is present or has been added to the apparatus, the additional fonts are made available to the user. Examples of a key include software code, a hardware, jumper or a card with a hardware identification or jumper.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
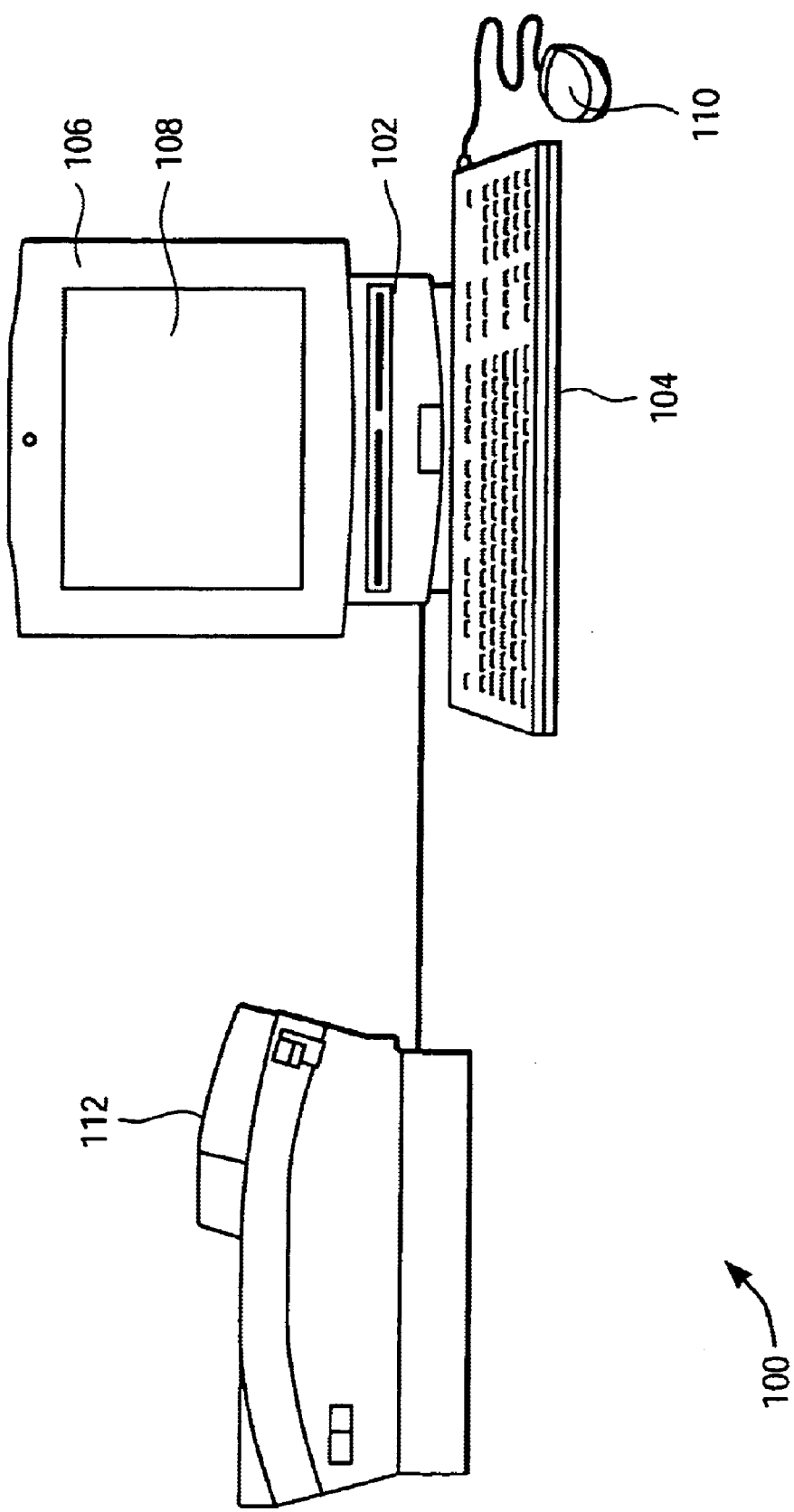
FIG. 1 illustrates a preferred system that may be used to implement the method and apparatus for additional font availability according to the present invention.

With reference now to the figures and in particular with reference to FIG. 1, a system is illustrated that may be used to implement the system and method for additional font availability according to the present invention. Computer system 100 includes a computer 102, keyboard 104, a monitor 106 having a display screen 108, a cursor control device 110, shown here as a mouse, and a printer 112. Computer system 100 may be implemented using any suitable computer and printer, such as a Macintosh Performa® computer and a Color LaserWriter® 12/600 PS, both products of Apple Computer, Incorporated, located in Cupertino, Calif.

Figure 2:
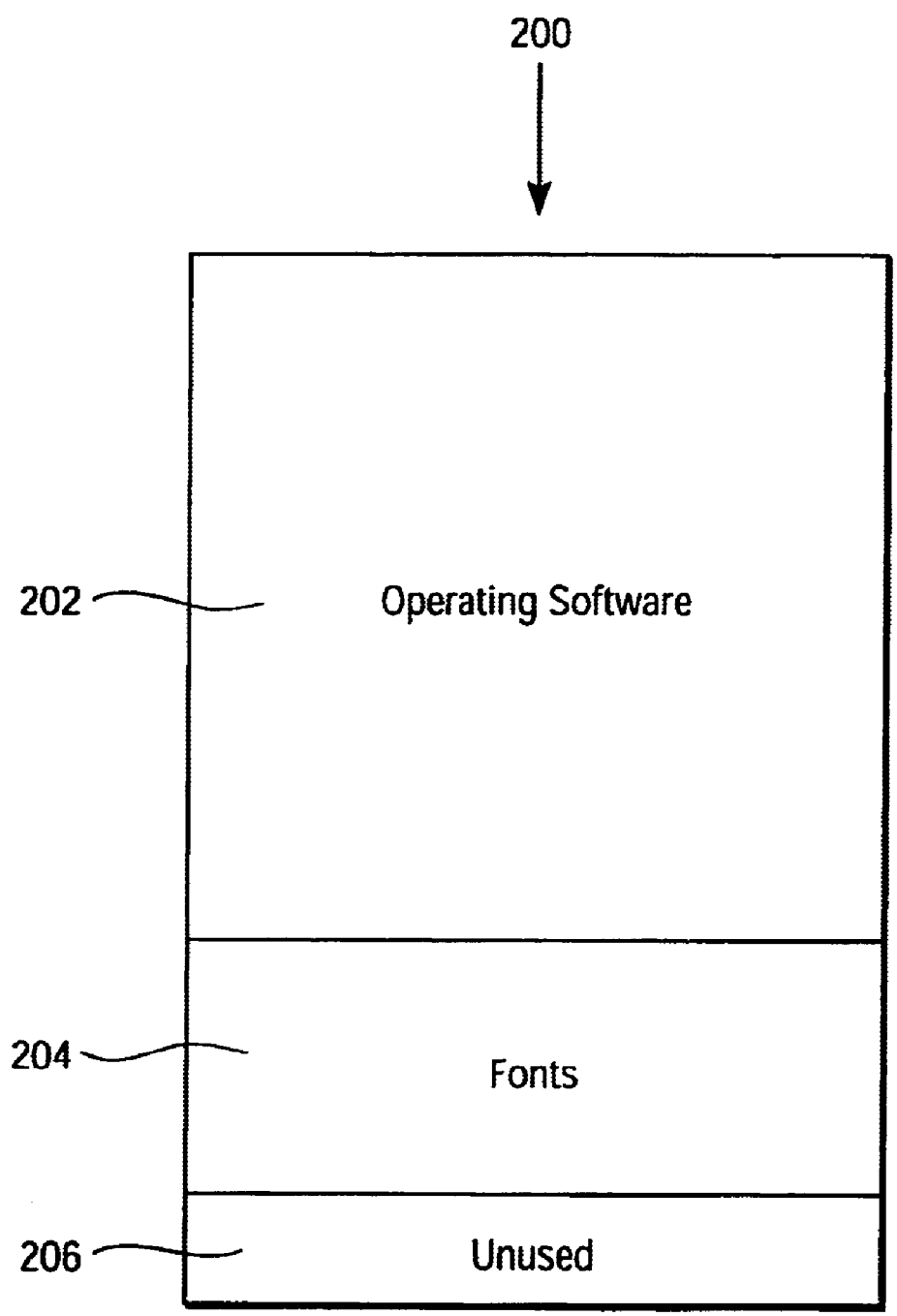
FIG. 2 is a pictorial representation of a read-only memory (ROM) according to the prior art.

FIG. 2 is a pictorial representation of a read-only memory (ROM) according to the prior art. ROM 200 may be a single ROM or a set of ROMs. ROM 200 is comprised of operating software 202, fonts 204, and unused memory 206. Operating software 202 includes such items as an operating system, device drivers, and page description languages such as Postscript® or PCL™. Fonts 204 are fonts stored in ROM 200 by the printer manufacturer, so that when the printer is purchased by a user, all of the fonts that will be made available to the user are included with the printer.

Typically ROM is assembled in a manner that results in the total amount of ROM being a factor of two, i.e. two megabytes, four megabytes, eight megabytes, or more. This factor of two construction is generally due to the cost of memory and the way memory is organized. But assembling ROM in this manner can result in a portion of the ROM not being used. For example, an apparatus that needs five megabytes of ROM may in actuality have six or eight megabytes of installed ROM. Thus, the apparatus will have one to three megabytes of unused ROM. The present invention utilizes this unused memory for storing additional fonts in an output device such as a printer. In the preferred embodiment, the additional fonts are made available to the user when a key is present.

Figure 3:
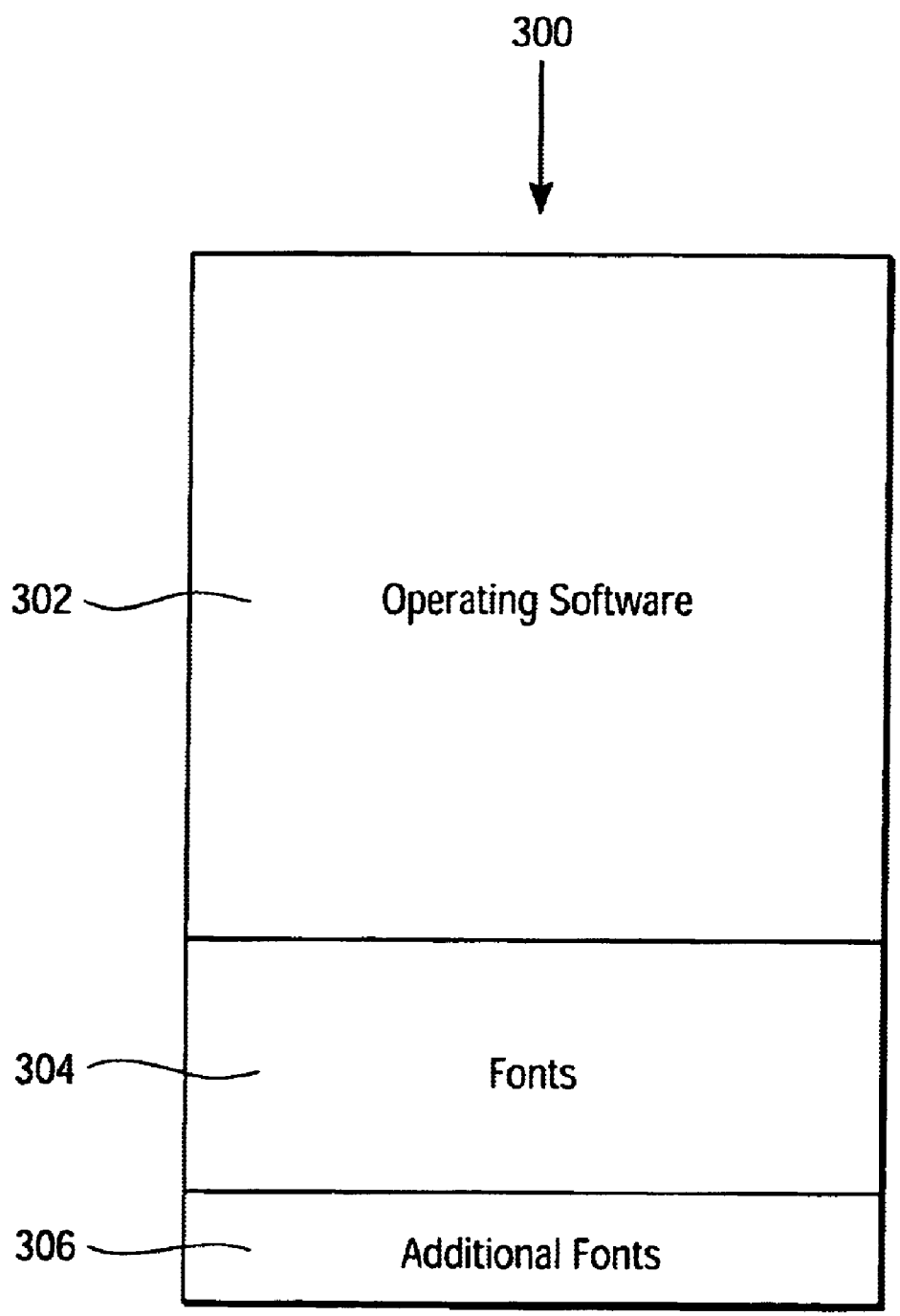
FIG. 3 is a pictorial representation of a read-only memory (ROM) that may be used to implement the method and apparatus for additional font availability according to the present invention.

FIG. 3 is a pictorial representation of a read-only memory (ROM) that may be used to implement the method and apparatus for additional font availability according to the present invention. ROM 300 may be a single ROM or a set of ROMs, and is preferably located in a printer. ROM 300 is comprised of operating software 302, fonts 304, and additional fonts 306. Operating software 302 preferably includes such items as an operating system, device drivers, and page description languages such as Postscript® or PCL™.

Additional fonts 306 are stored in what would have been unused space within ROM 300. Fonts 304 and additional fonts 306 are preferably stored by the printer manufacturer, so that when the printer is purchased by a user the fonts are included with the printer. Fonts 304 and additional fonts 306 are stored in the ROM in a manner that eliminates or minimizes the amount of unused ROM space. Thus, the total number of fonts in the printer is increased without any additional hardware.

Figure 4:
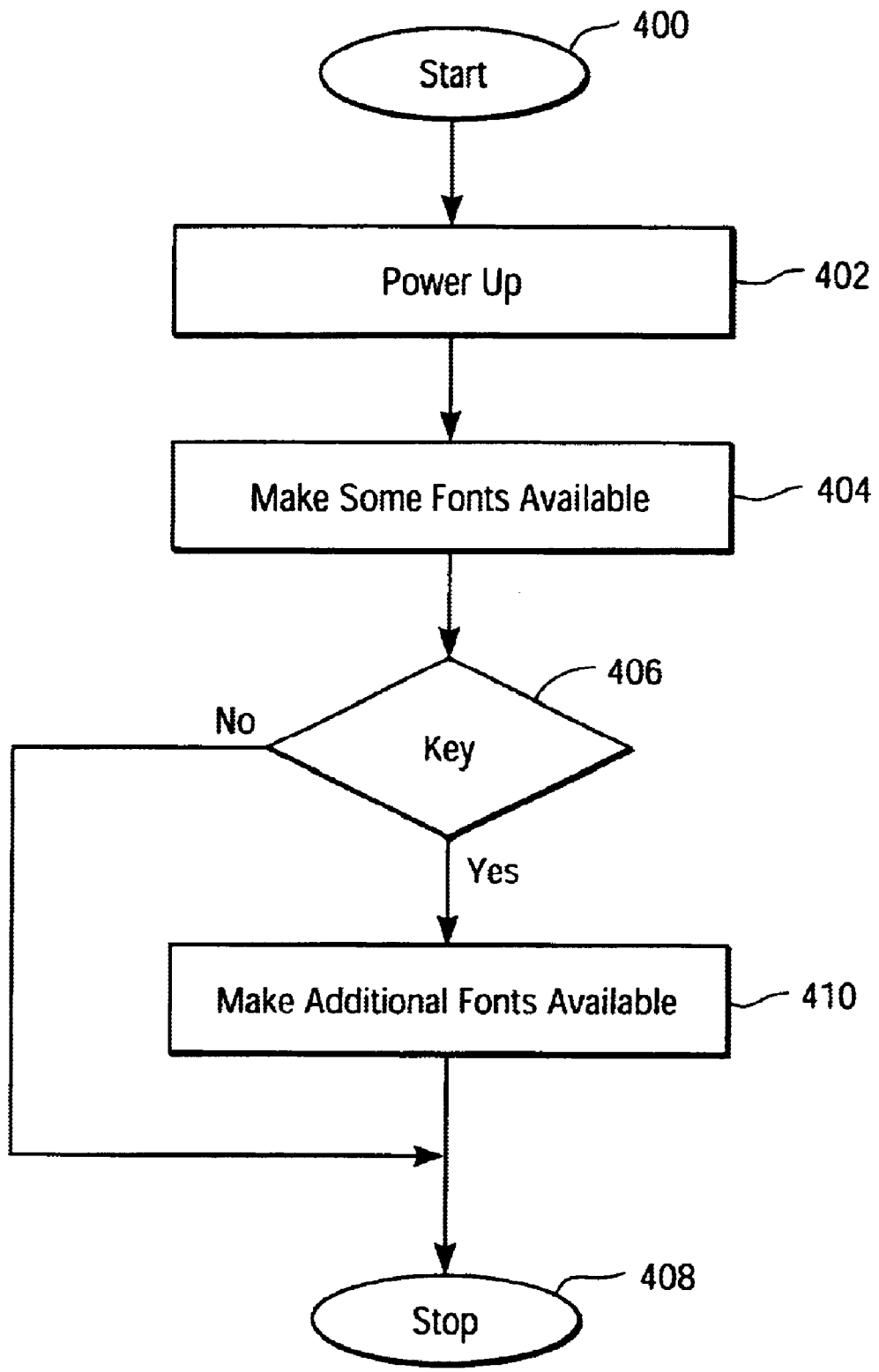
FIG. 4 is a flowchart depicting a preferred method for additional font availability according to the present invention.

Referring to FIG. 4, a flowchart depicts a preferred method for additional font availability according to the present invention. The method begins at block 400, with all fonts stored in ROM within the printer. The fonts are stored in the ROM in a manner that eliminates or minimizes the amount of unused space in the ROM. Additionally, the amount of RAM in the printer needs to be large enough to store all the fonts.

Next, a user turns on the printer, and a portion of the fonts stored in the ROM are then made available using techniques known in the art. These two steps are illustrated in blocks 402 and 404, respectively. A determination is then made as to whether or not a key is present or has been added to the printer. This step is depicted in block 406. The key can be one of several items, examples being software code, a hardware jumper or a card with a hardware identification or jumper.

For example, a hardware jumper can be inserted into the printer to complete an electrical circuit. The software can sense this completed circuit. Once the completed circuit is sensed, the additional fonts are made available to the user.

If the key is not present, the process ends, as shown in block 408. In this case, only a portion of the fonts stored in ROM are made available to the user. If the key is present, the process passes to block 410 where the additional fonts are made available from the ROM. Now the user can use all of the fonts stored in the printer. The process then ends, as shown in block 408.

One advantage to the present invention is that a larger number of fonts can be made available to a user for less cost. By storing the additional fonts in the unused space in the ROM, a printer manufacturer does not have to purchase and use additional ROM in order to offer a greater number of fonts on a printer. Since the use of existing memory is more efficient, the cost to manufacture the printer is reduced. Lowering the manufacturing costs results in a lower purchase price for the printer. Another advantage is that the additional fonts can be made available more easily than prior art methods.

While the invention has been particularly shown and described with reference to a preferred embodiment, it will be understood by those skilled in the art that various changes in form and detail may be made therein without departing from the spirit and scope of the invention. For example, the present invention is not limited to using read only memory to store the additional fonts. Any storage medium having unused space can be used. Furthermore, the present invention can be implemented in devices other than printers, such as pre-press machines.

What is claimed is:

1. A method for making at least one additional font available to a system, wherein data is stored in a storage medium and is available to the system, the method comprising the steps of:
    storing the at least one additional font in the storage medium in a manner that minimizes or eliminates an amount of unused space in the storage medium;
    determining whether or not a key is associated with the system;
    making at least one of the at least one additional font stored in the storage medium available to the system when the key is associated with the system; and
    having only the data stored in the storage medium be available to the system when the key is not associated with the system.

2. The method of claim 1, wherein the data comprises a plurality of fonts.

3. The method of claim 1, wherein the storage medium comprises a read only memory.

4. The method of claim 1, wherein the system comprises a printer.

5. The method of claim 1, wherein the step of determining whether or not a key is associated with the system is performed when the system is first turned on and is undergoing initial configuration.

6. A method for making at least one additional font stored in a storage medium available to a system, wherein the at least one additional font is stored in the storage medium in addition to a plurality of fonts, and wherein the at least one additional font is stored in the storage medium in a manner that minimizes or eliminates an amount of unused space in the storage medium, the method comprising the steps of:
    determining whether or not a key is associated with the system;
    making the plurality of fonts available to the system when the key is not associated with the system; and
    making the plurality of fonts and at least one of the at least one additional font available to the system when the key is associated with the system.

7. The method of claim 6, wherein the step of determining whether or not a key is associated with the system is performed when the system is first turned on and is undergoing initial configuration.

8. The method of claim 6, wherein the storage medium comprises a read only memory.

9. The method of claim 6, wherein the system comprises a printer.

10. A system, comprising:
    a storage medium having data stored therein, wherein the data is available to the system;
    at least one additional font stored in the storage medium in a manner that minimizes or eliminates an amount of unused space in the storage medium; and
    means for determining whether or not a key is associated with the system, wherein at least one of the at least one additional font is made available to the system when the key is associated with the system and when the key is not associated with the system having only the data stored in the storage medium be available to the system.

11. The system of claim 10, wherein the data comprises a plurality of fonts.

12. The system of claim 10, wherein the storage medium comprises a read only memory.

13. The system of claim 10, wherein the system comprises a printer.

* * * * *